(12) United States Patent
Pitts

(10) Patent No.: US 11,624,646 B2
(45) Date of Patent: Apr. 11, 2023

(54) PORTABLE WEIGHING SCALE FOR WEIGHING BALED CROP IN FIELD

(71) Applicant: Monsanto Technology LLC, St. Louis, MO (US)

(72) Inventor: Daniel L. Pitts, Lexington, SC (US)

(73) Assignee: Monsanto Technology LLC, St. Louis, MO (US)

(*) Notice: Subject to any disclaimer, the term of this patent is extended or adjusted under 35 U.S.C. 154(b) by 218 days.

(21) Appl. No.: 17/103,367

(22) Filed: Nov. 24, 2020

(65) Prior Publication Data

US 2022/0163372 A1 May 26, 2022

Related U.S. Application Data

(60) Provisional application No. 62/940,069, filed on Nov. 25, 2019.

(51) Int. Cl.
*G01G 19/18* (2006.01)
*A01D 90/12* (2006.01)
*G01G 17/00* (2006.01)
*G01G 19/12* (2006.01)
*B60P 1/44* (2006.01)

(52) U.S. Cl.
CPC ............. *G01G 19/18* (2013.01); *A01D 90/12* (2013.01); *B60P 1/4471* (2013.01); *G01G 17/00* (2013.01); *G01G 19/12* (2013.01)

(58) Field of Classification Search
CPC ........ G01G 19/10; G01G 19/12; G01G 19/16; G01G 19/18; G01G 21/28; G01G 17/00; G01G 5/04; B06P 1/4471; A01D 90/12
See application file for complete search history.

(56) References Cited

U.S. PATENT DOCUMENTS

| | | | | |
|---|---|---|---|---|
| 2,513,855 A * | 7/1950 | Fogwell | ............... | B62D 53/062 280/43.11 |
| 4,491,190 A * | 1/1985 | Mayfield | ................ | G01G 19/10 177/139 |
| 4,792,004 A * | 12/1988 | Sheffield | ................ | G01G 19/10 177/208 |
| 5,929,389 A * | 7/1999 | Keuper | ................ | G01G 19/083 701/50 |
| 2021/0276636 A1* | 9/2021 | Griffee | ................ | B62D 53/062 |

* cited by examiner

*Primary Examiner* — Randy W Gibson
(74) *Attorney, Agent, or Firm* — Harness, Dickey & Pierce, P.L.C.

(57) ABSTRACT

A portable weighing scale for weighing a bale of crop includes a support frame configured to be transported on ground. A powered lift is operatively coupled to the support frame and configured to lift the bale of crop off the ground. A weight measurement system is operatively coupled to the support frame and configured to measure the weight or mass of the bale of crop when the bale of crop is lifted off the ground by the power lift.

20 Claims, 17 Drawing Sheets

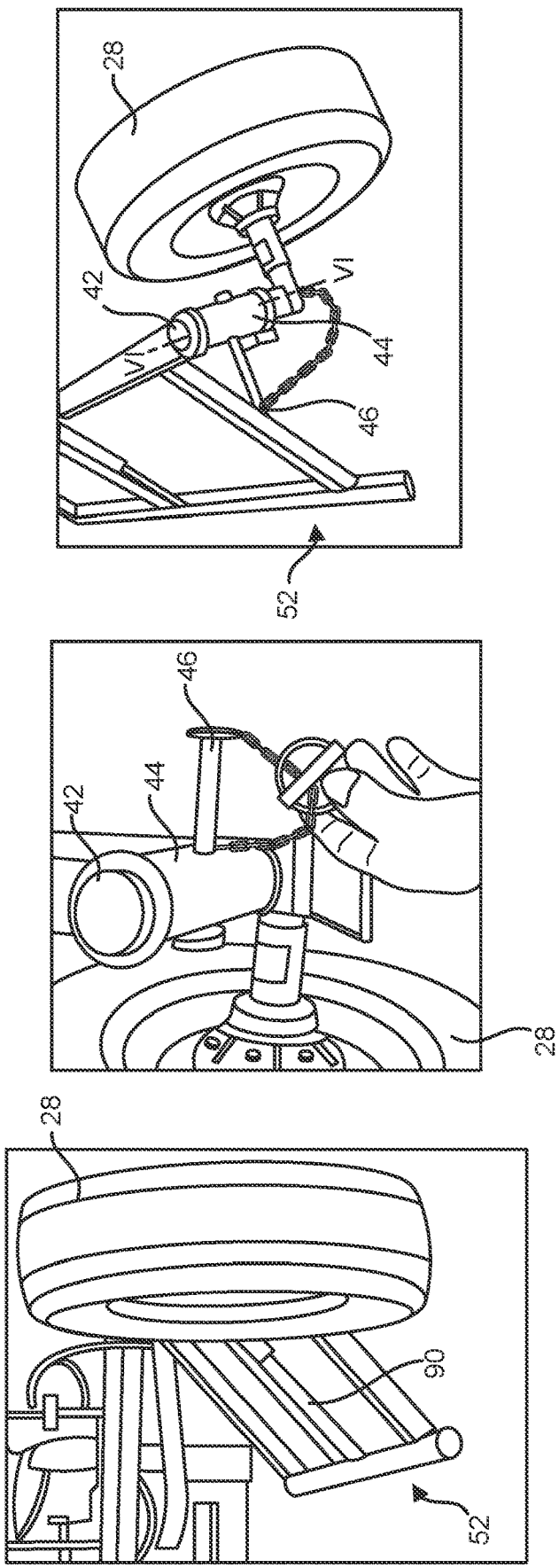

PORTABLE WEIGHING SCALE FOR WEIGHING BALED CROP IN FIELD

CROSS-REFERENCE TO RELATED APPLICATION

The present application claims priority to U.S. Provisional Application No. 62/940,069, filed Nov. 25, 2019, the entirety of which is hereby incorporated by reference.

FIELD OF THE DISCLOSURE

The present disclosure generally relates to a portable weighing scale suitable for weighing baled crop in the field.

BACKGROUND OF THE DISCLOSURE

Harvested crop may be formed into bales for transportation, storage, and other reasons. For example, presently harvesters for cotton may build large, heavy (e.g., about 5,500 lb.) round cotton modules or bales within the harvester. Once bales are built onboard the harvester, they are lowered individually onto the field. To determine yield, the bales are weighed. However, attaining weights of these individual bales currently requires additional equipment, manpower and scheduling. Current systems use cumbersome flat scales and a large tractor lift system to transport the bales to the scales and obtain weight data.

SUMMARY OF THE DISCLOSURE

In one aspect, a portable weighing scale for weighing a bale of crop generally comprises a support frame configured to be transported on ground; a powered lift operatively coupled to the support frame and configured to lift the bale of crop off the ground; and a weight measurement system operatively coupled to the support frame and configured to measure the weight or mass of the bale of crop when the bale of crop is lifted off the ground by the power lift.

In yet another aspect, a method of weighing a bale of crop in field generally comprises towing a portable weighing scale to the bale of crop in the field; lifting the bale of crop off the ground in the field using a powered lift of the portable weighing scale; and measuring the weight or mass of the lifted bale of crop using a weight measurement system of the portable weighing scale.

Other features will be in part apparent and in part pointed out hereinafter.

BRIEF DESCRIPTION OF THE DRAWINGS

FIG. 8 is an enlarged rear view of the right wheel lifted off the ground by the right lift arm, with the right wheel in the road position;

FIG. 9 is an enlarged view of the right wheel of FIG. 7 and showing a locking pin being removed to unlock the wheel;

FIG. 10 is an enlarged view of the right wheel rotated to the weighing position;

Corresponding reference characters indicate corresponding parts throughout the drawings.

DETAILED DESCRIPTION OF THE DISCLOSURE

Figure 1:
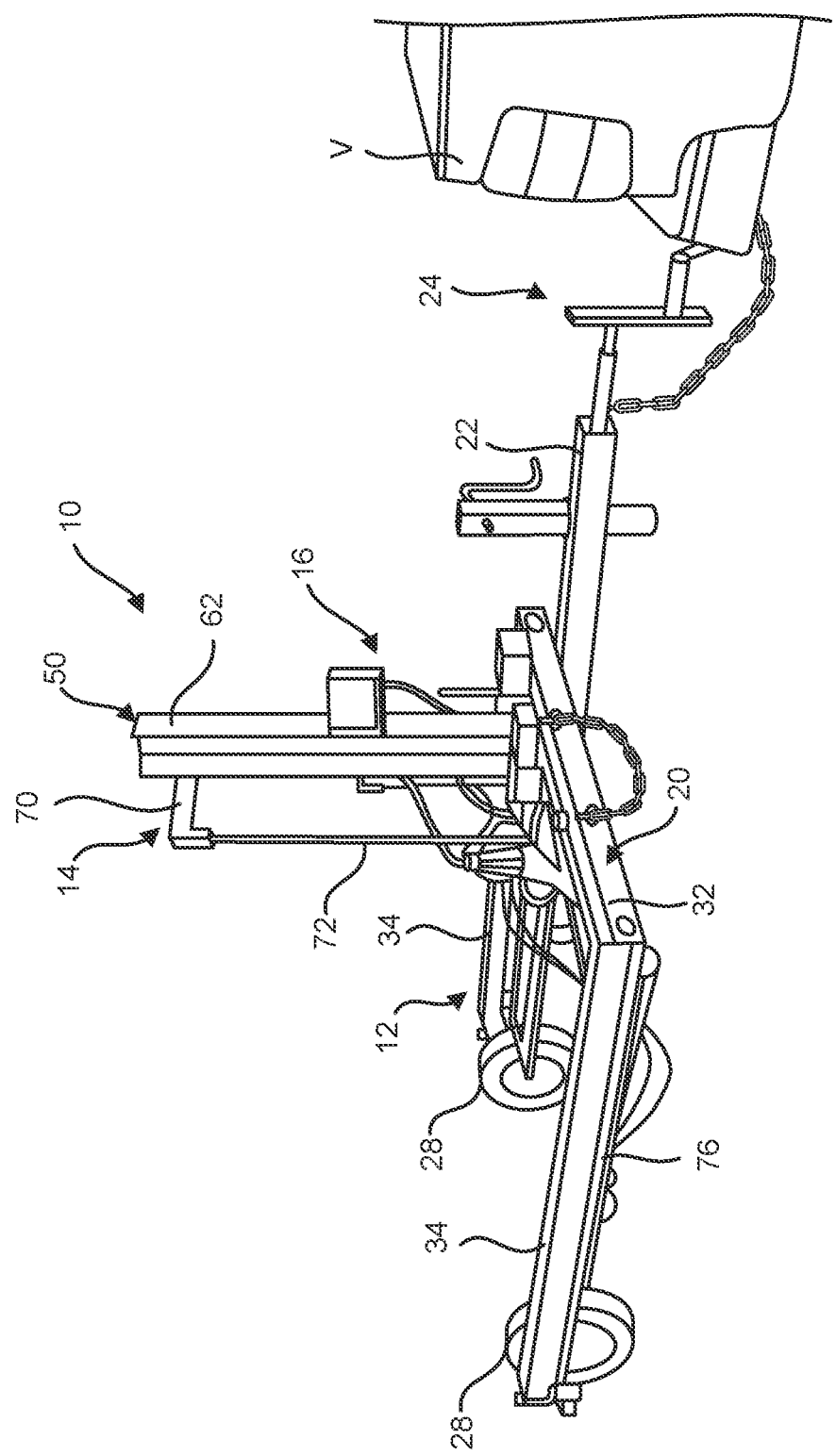
FIG. 1 is a perspective of a portable weighing scale attached to a vehicle.
Figure 2:
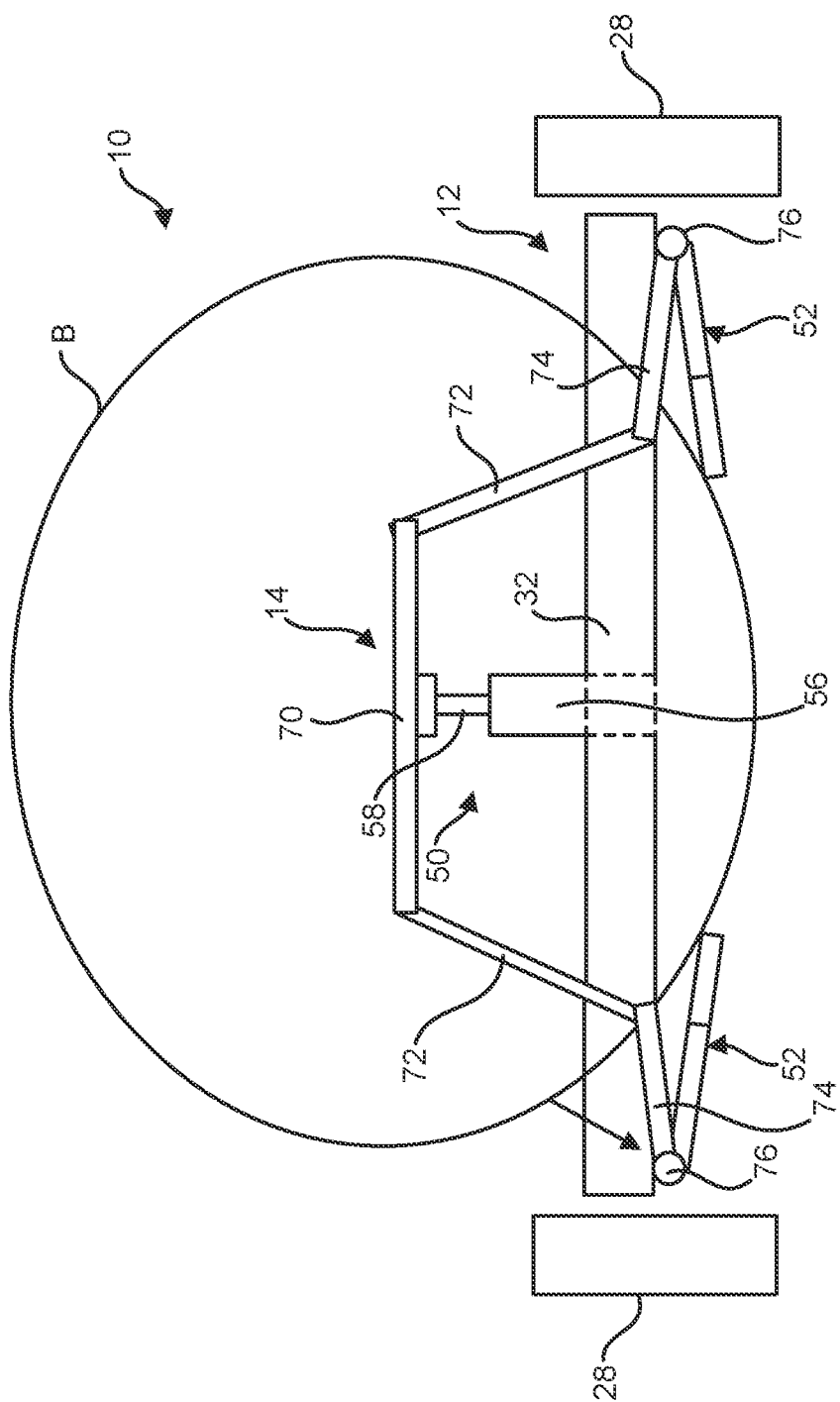
FIG. 2 is a schematic front elevational view of the weighing scale including a bale of crop lifted by a powered lift of the weighing scale.

Referring to FIGS. 1 and 2, a portable weighing scale for weighing a bale of crop B in the field is generally indicated at reference numeral 10. The illustrated weighing scale 10 is configured to be towed by a vehicle V, such as a pickup truck, in the crop field. In this way, the weighing scale 10 can be moved to individual bales B within the field at the locations where the harvester or baler placed the respective bales. The illustrated weighing scale 10 can also be towed on a road (e.g., highway or other county, city or state street or road) to transport the weighing scale to different fields. It is envisioned that the weighing scale 10 may be used easily and readily by a single operator, although more than one operator may be used. The weighing scale 10 may be used with any crop formed into bales, including but not limited to cotton, grasses, wheat, corn, and soybeans among others. The illustrated weighing scale 10 includes a wheeled trailer 12, a powered lift 14 coupled to the trailer and configured to lift or pick up the bale of crop B, and a weight measurement system 16 configured to obtain the weight or mass of the lifted bale of crop. The weighing scale 10 is configured to lift and weigh a bale of crop having a weight up to about 6,000 lb., a diameter up to about 90 in, and a length of about 96 in, although the weight and dimensional limits may be higher or lower in other embodiments.

The trailer 12 generally includes a support frame 20 (e.g., U-shaped frame); a tongue 22 extending forward from the frame; a trailer coupler 24 configured to couple the trailer to a hitch, such as a hitch attached to the truck V or other vehicle; and wheel(s) 28 coupled to the frame. The support frame 20 includes a front beam 32 and left and right side beams 34 attached to and extending rearward from the front beam. The frame 20 defines an open interior space 38 between the left and right side beams 34, in which the bale of crop B may be received. The rear of the trailer 12 is open (e.g., there is no rear beam connecting the side beams), such that the trailer can be moved in a reverse or rearward direction to position the trailer so that the bale of crop B is within the open interior space 38. The beams 32, 34 are generally rigid, and may be formed from metal, such as steel. The beams 32, 34 may be welded or otherwise secured or connected to one another.

The tongue 22 comprises a beam or other rigid, structural support connected to the frame 20. The trailer coupler 24 is attached to the tongue 22 adjacent a front end of the tongue. The trailer coupler 24 may be a conventional coupler suitable for coupling to a hitch (e.g., a tow ball) secured to the vehicle V. The tongue 22 may be formed from metal, such as steel, and welded or otherwise secured to the frame 20. The trailer 12 may be coupled to the vehicle V in other ways suitable for towing the trailer.

Figure 3:
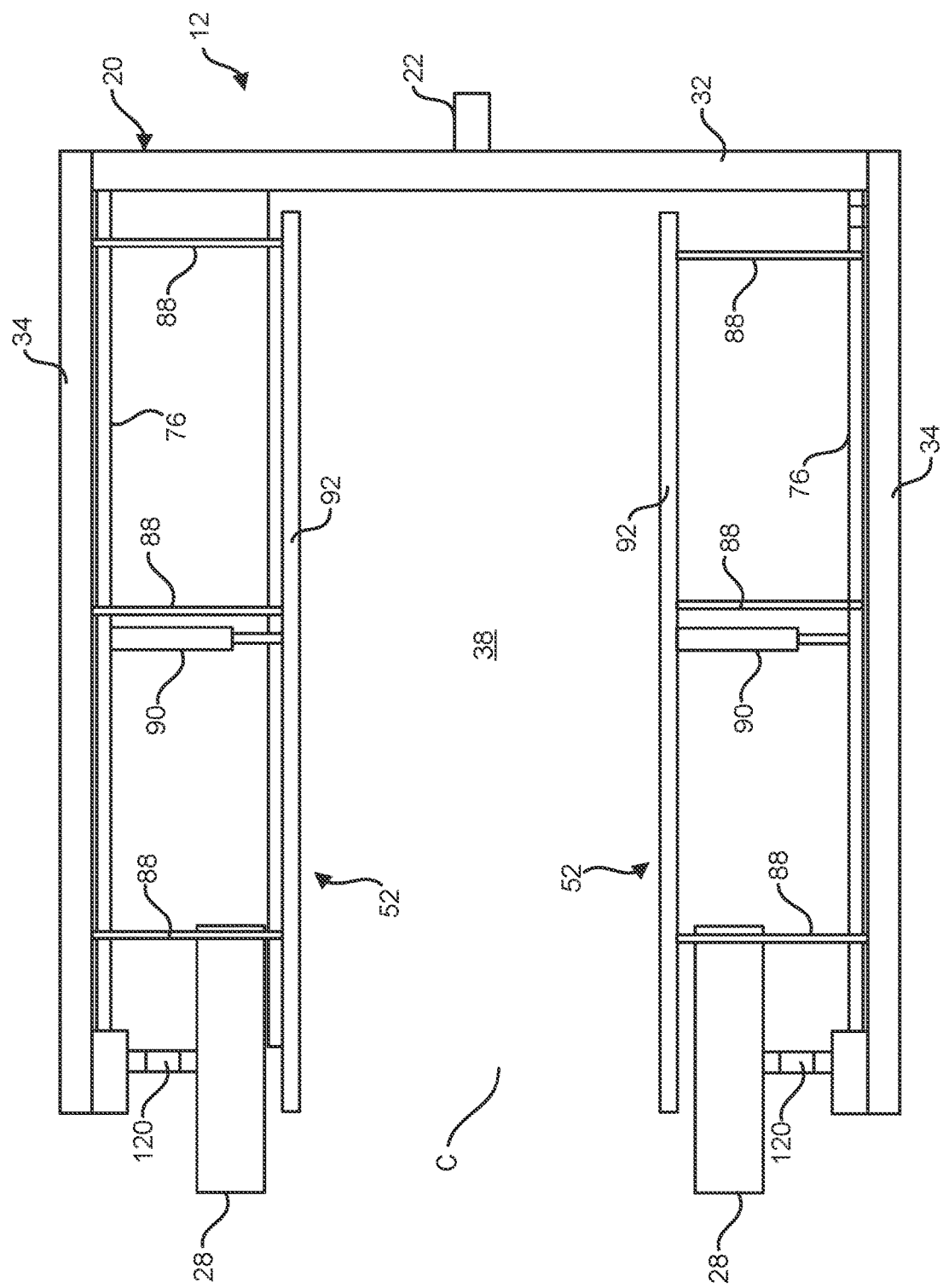
FIG. 3 is a schematic top plan view of a portion of the weighing scale, showing wheels of a trailer of the weighing scale in a road position.
Figure 4:
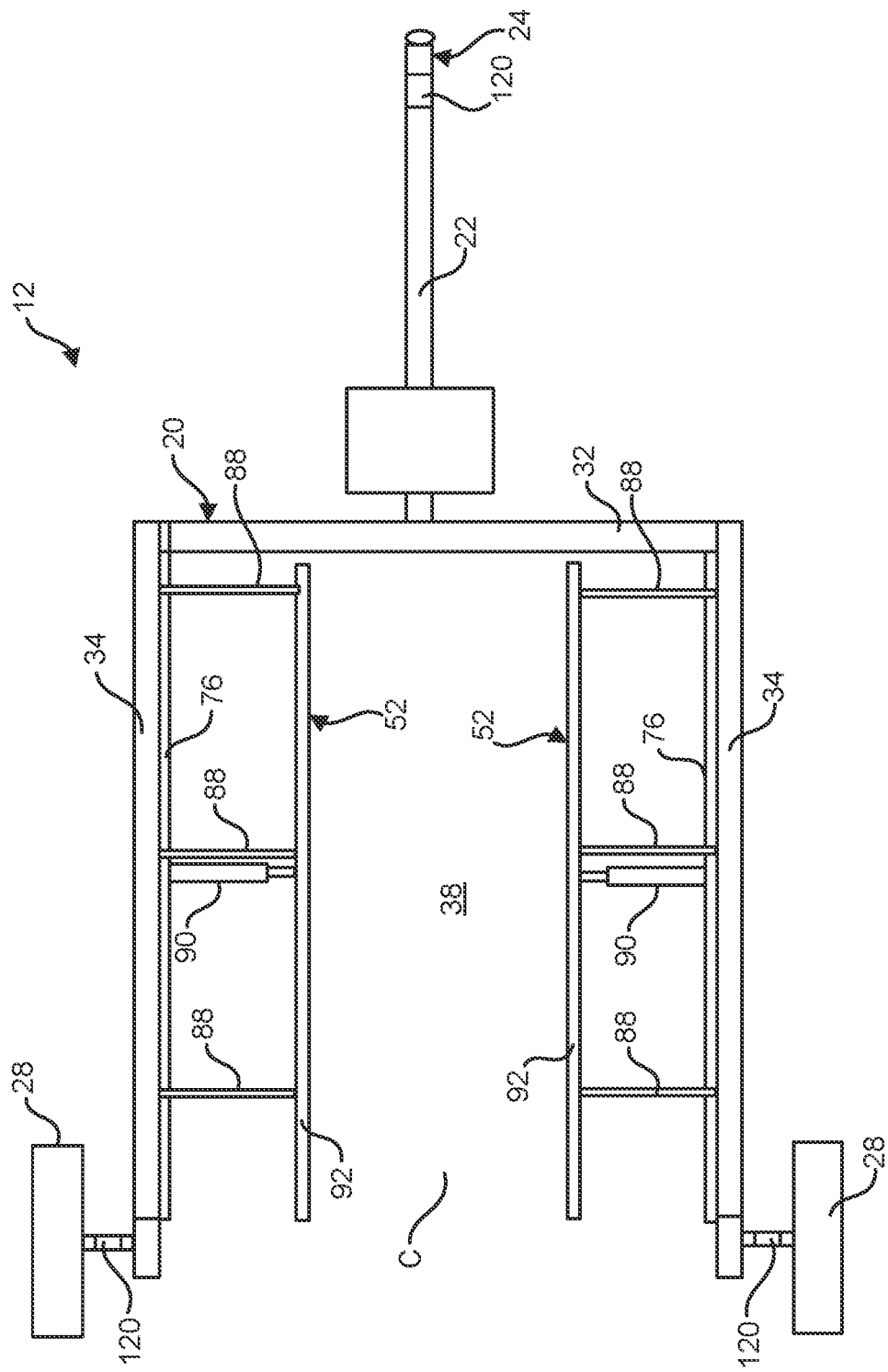
FIG. 4 is a schematic top plan view of a portion of the weighing scale, showing the wheels of the trailer in a weighing position.
Figure 5:
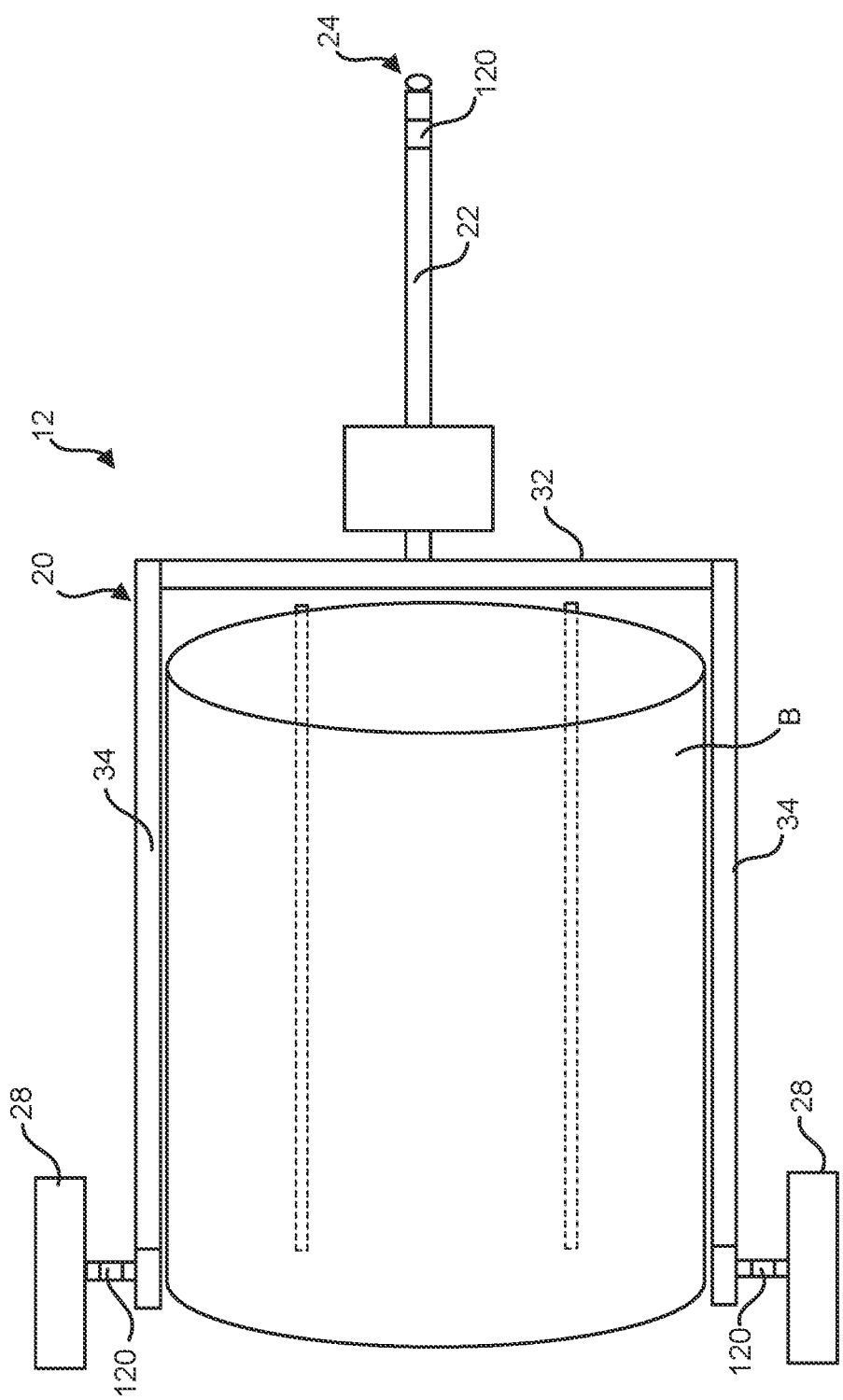
FIG. 5 is similar to FIG. 4, showing the bale of crop on the weighing scale.
Figure 6:
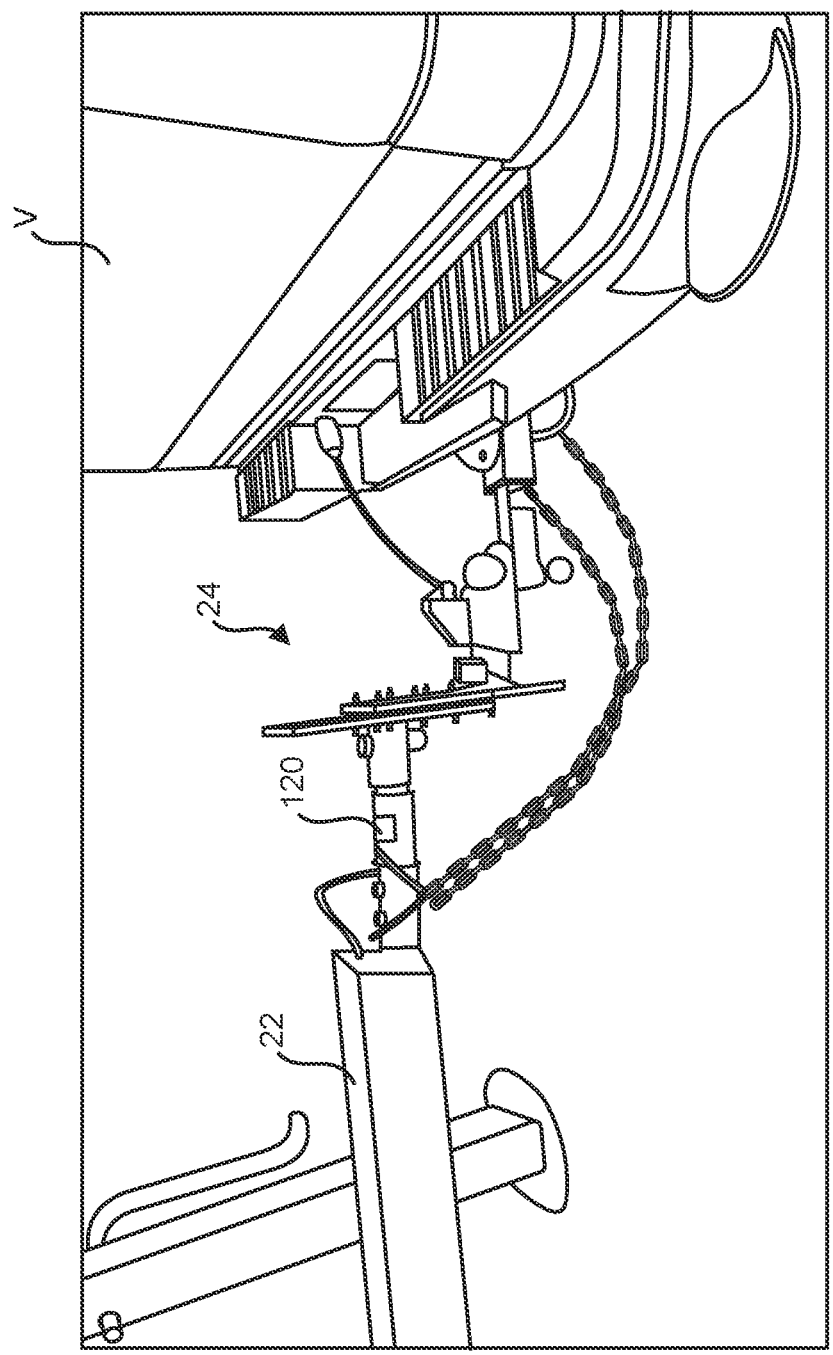
FIG. 6 is an enlarged perspective view of a tongue of the trailer, and a trailer coupler coupled to the vehicle.
Figure 7:
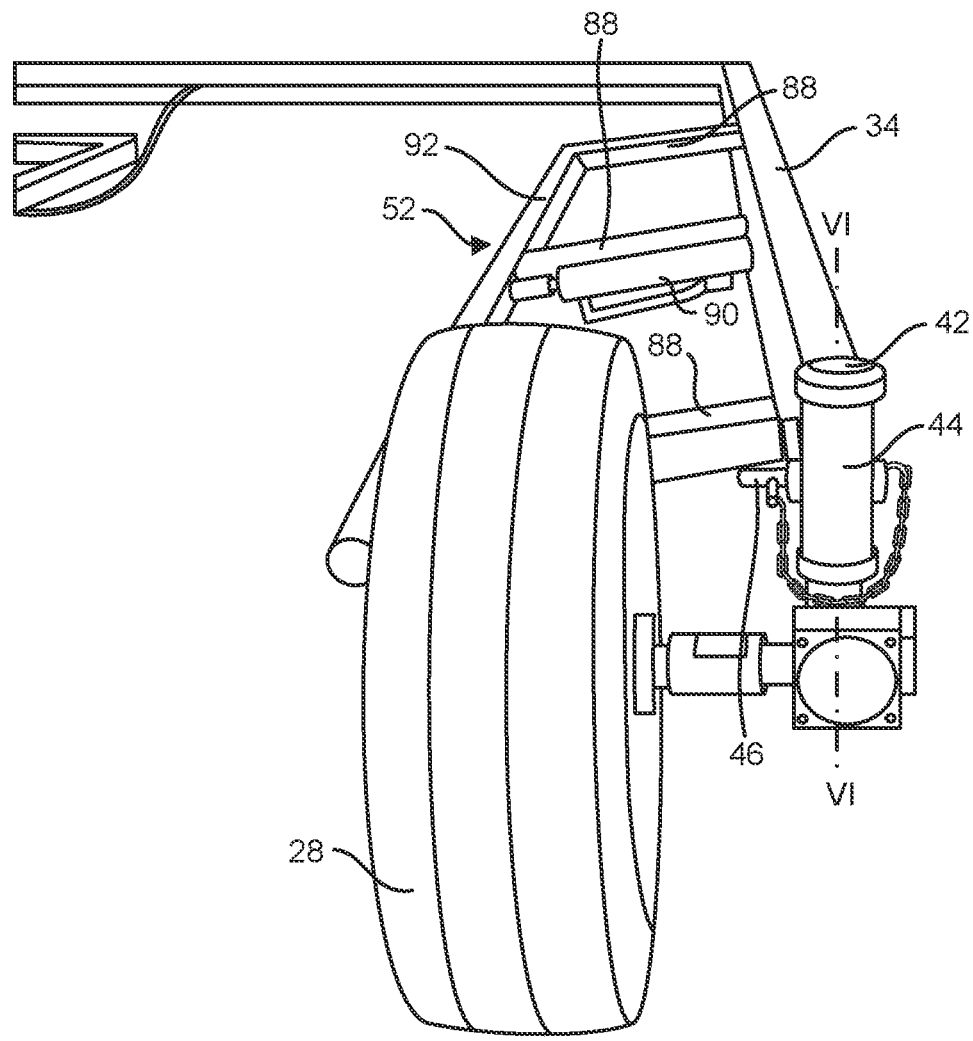
FIG. 7 is an enlarged, rear view of a right side of the weighing scale, with the right wheel in the road position and a right lift arm of the lift in an upward lifting position and a retracted position.

The wheels 28 are coupled to the frame 20 adjacent the rear thereof. In particular, each wheel 28 is coupled to one of the side beams 34. In the illustrated embodiment, the positions of the wheels 28 are movable (e.g., rotatable) relative to the frame 20 between a road position, as shown in FIGS. 1 and 3, for example, and a weighing position, as shown in FIGS. 2, 4, and 5. In the road position, the wheels 28 are positioned laterally inward of the respective side beams 34, generally within the open interior space 38. In the weighing position, the wheels 28 are positioned laterally outward of the respective side beams 34, generally outside the open interior space 38. The wheels 28 are positioned in the road position when traveling on a road, and the wheels are positioned in the weighing position when in operation in the field. Through this design, a width of the frame 20 between the side beams 34 can be maximized to maximize a width of the open interior space 38 to allow for weighing bales B with large diameters (e.g., up to about 90 in), while still abiding laws restricting the width of towed vehicles on roads. Referring to FIGS. 8-10, for example, the wheels 28 are selectively rotatable relative to the frame 20 about a generally vertical axis V1. For example, posts 42 coupled to the wheels 28 (e.g., coupled to the wheel axles) may be received in respective openings (e.g., sleeves 44) of the frame 20 to allow for rotation of the posts within the openings. A locking pin 46 or other locking device, such as a detent, may be receivable through each of the posts 42 and the frame 20 (e.g., sleeves 44) to selectively retain the wheels 28 in the desired position. It is understood that the position of the wheels 28 relative to the frame 20 may not be movable in other embodiments.

Figure 11:
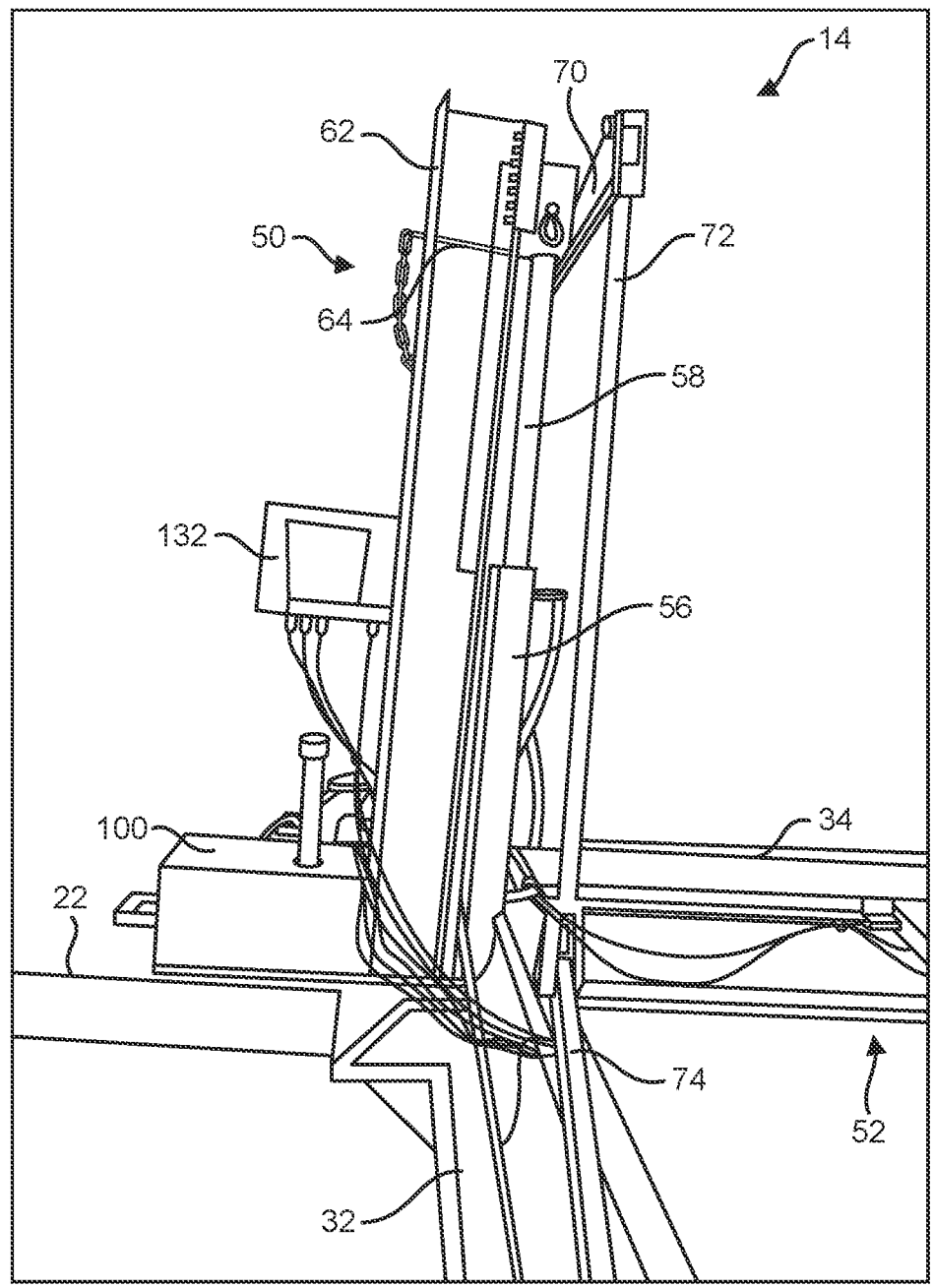
FIG. 11 is an enlarged side elevational view of a front end portion of the weighing scale.

Referring to FIGS. 1, 2, and 11, the powered lift 14 includes a jack 50; left and right lift arms 52 rotatably coupled to frame 20, more specifically, to respective left and right side beams 34; and a mechanical linkage (components referenced below) operatively connecting the jack to the lift arms to impart rotation of the lift arms relative to the frame. The illustrated jack 50 includes a cylinder 56 having a piston 58 that is extendable from a barrel in an upward direction.

The jack 50 is secured to the frame 20 adjacent the front end thereof, and it is generally centrally located relative to the front beam 32, generally adjacent the junction of the front beam and the tongue 22. The illustrated cylinder 56 is powered hydraulically, although it may be powered in other ways. A hydraulic system for powering the jack 50 is explained in more detail below. The piston 58 of the cylinder 56 is coupled to a track for guiding and supporting upward movement of the piston. The track includes a rigid mast 62 secured to the frame 20 (e.g., to the front beam 32). The mast 62 may be formed from metal, such as steel. A removable safety pin 64 insertable into the mast 62 is used to lock the piston 58 in the upward or extended position when not in use.

Figure 16:
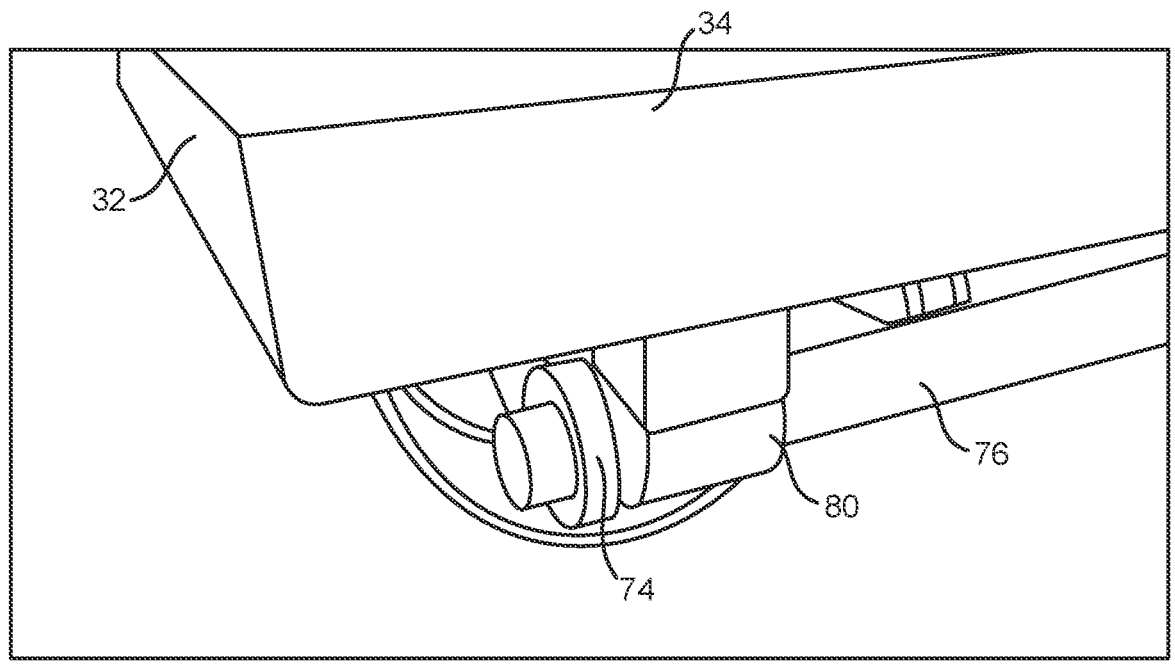
FIG. 16 is an enlarged view of a rocker link coupled to a rotational driving link.

The mechanical linkage includes a cross link 70 secured adjacent an upper end of the piston 58, left and right vertical links 72 pivotably connected to the cross link, left and right rocker links 74 pivotably coupled to lower ends of the respective left and right vertical links, and left and right rotational driving links 76 coupled to the respective rocker links and the respective left and right lift arms 52. The cross link 70 may be fixedly attached to the piston 58, and the piston and the cross link together may have a T-shape. Upper ends of the left and right vertical links 72 (e.g., rods) are pivotaly secured to the cross link 70 adjacent respective left and rights ends of the cross link such that the vertical links can pivot in a generally vertical plane or about a horizontal axis. Pivot pins may connect the vertical links 72 to the cross link 70. The upper ends of the vertical links 72 may be fixedly secured to the cross link 70 in other embodiments. The lower ends of the vertical links 72 are pivotably secured to first or inner ends of the respective rocker links 74 such that the rocker links can pivot in a generally vertical plane or about a horizontal axis. Pivot pins may connect the vertical links 72 to the respective rocker links 74. The upper ends of the vertical links 72 may be fixedly secured to the rocker links 74 in other embodiments. The rotational driving links 76 are coupled (e.g., fixedly coupled) to rocker links 74 adjacent second or outer ends of the respective rocker links. The rotational driving links 76 are rotationally coupled to the frame 20, and in particular, to the respective left and right side beams 34. For example, the driving links 76 may be received in sleeves 80 (FIG. 16) secured to the side beams 34. The driving links 76 extend generally along the lengths of the respective side beams 34 and are generally inhibited from movement other than rotation about their longitudinal axes. The mechanical linkage may be formed from metal, such as steel.

Figure 13:
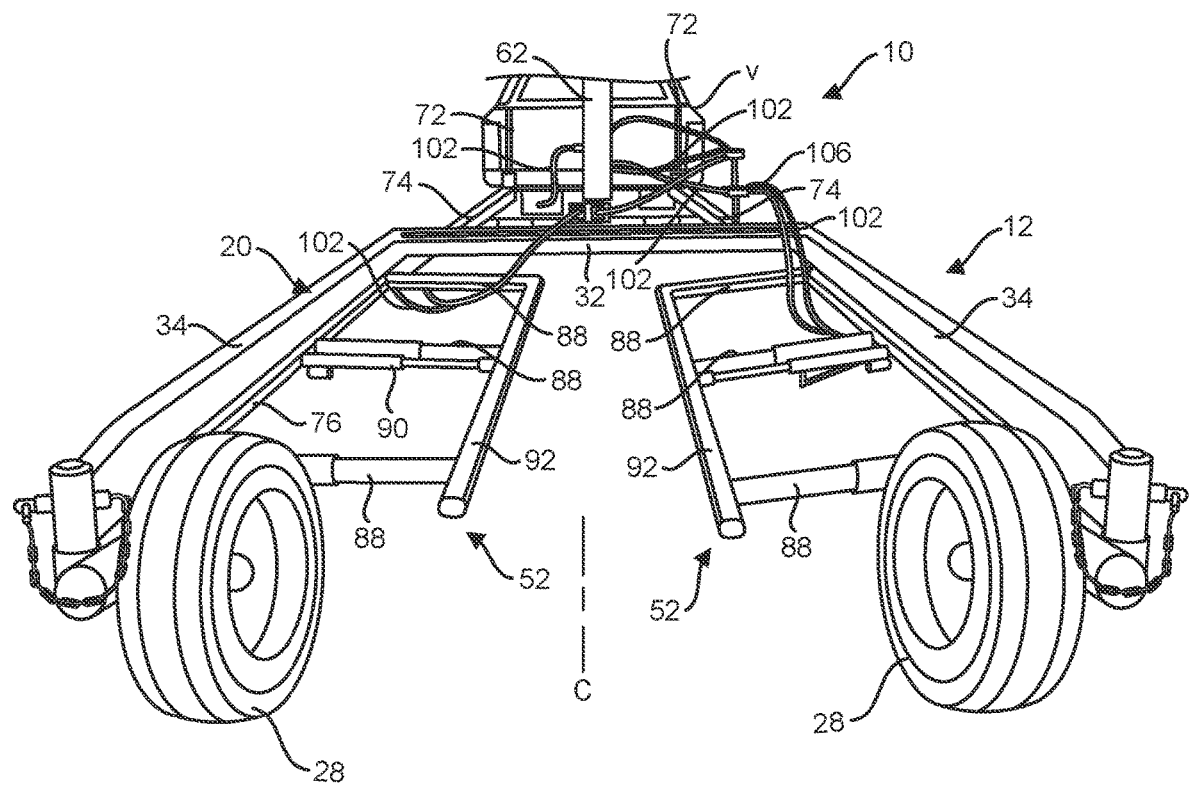
FIG. 13 is similar to FIG. 12, with the lift arms in the extended position.
Figure 14:
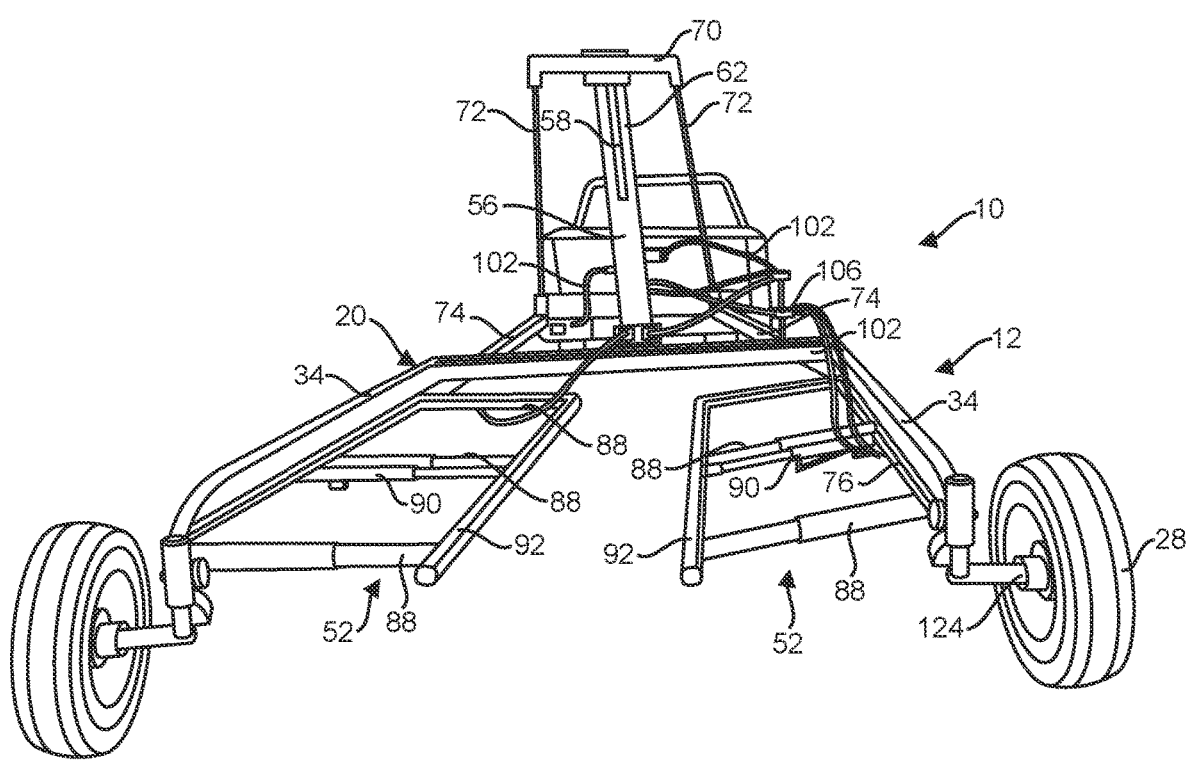
FIG. 14 is similar to FIG. 12, with the right wheel in the weighing position.
Figure 15:
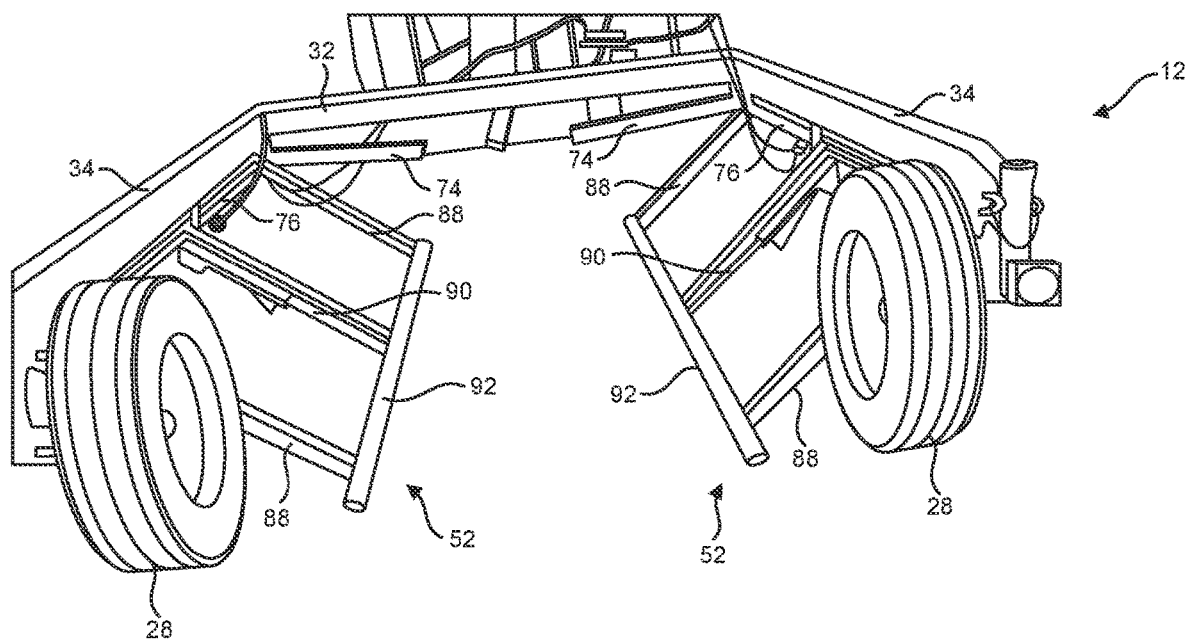
FIG. 15 is similar to FIG. 13 with the lift arms lifting the wheels off the ground.

Referring to FIGS. 2-5, for example, the lift arms 52 project generally laterally inward into the open interior space 38 from the respective rotational driving links 76. The lift arms 52 are coupled to the respective rotational driving links 76 such that rotation of the driving links 76 about their respective longitudinal axes imparts rotation of the lift arms in either an upward or downward direction. Accordingly, the lift arms 52 rotate about the horizontal axes of the respective driving links 76, generally along an arc. The lift arms 52 may be rotatable between an upper lifting position, in which the arms are angled between about 60 degrees and about 90 degrees from the respective left and right side beams 34 (FIGS. 12 and 13), and a lower loading position, in which the arms extend between about 45 degrees and about 10 degrees from the respective left and right side beams (FIGS. 14 and 15). The lift arms 52 may be formed from metal, such as steel.

In the illustrated embodiment, each lift arm 52 is also configured to be extendable laterally inward into the open interior space 38 to facilitate lifting of the bale of crop B. In other words, each lift arm 52 can extend laterally relative to the respective side beam 34 to increase its width and retract laterally to decrease its width. Each lift arm 52 includes telescoping cross bars 88 (e.g., three telescoping cross bars) extending inward into the open interior space 38 from the driving link 76, an arm cylinder 90 (e.g., hydraulic cylinder) extending inward into the open interior space from the driving link, and a longitudinal bar 92 secured to the opposite ends of the cross bars and the piston of the arm cylinder. As explained below, the arm cylinders 90 may be powered by the same hydraulic system that powers the lift 14, to extend the lift arms 52 toward a center C of the open interior space and retract the lift arms away from the center. The arm cylinders 90 may be powered in other ways. The lift arms may be of other configurations suitable for lifting a bale of crop B.

Figure 17:
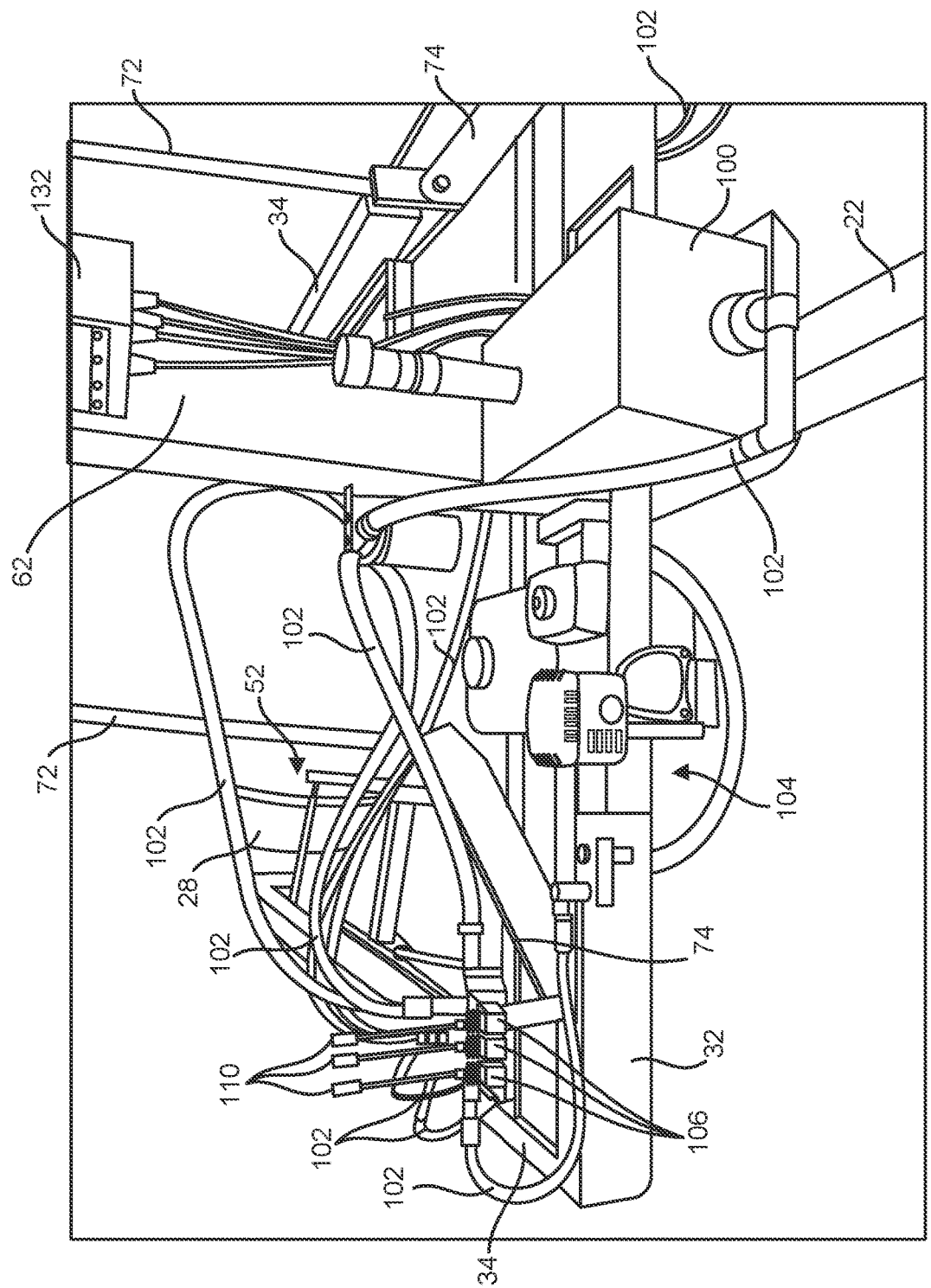
FIG. 17 is an enlarged view of a hydraulic system of the weighing scale.
Figure 18:
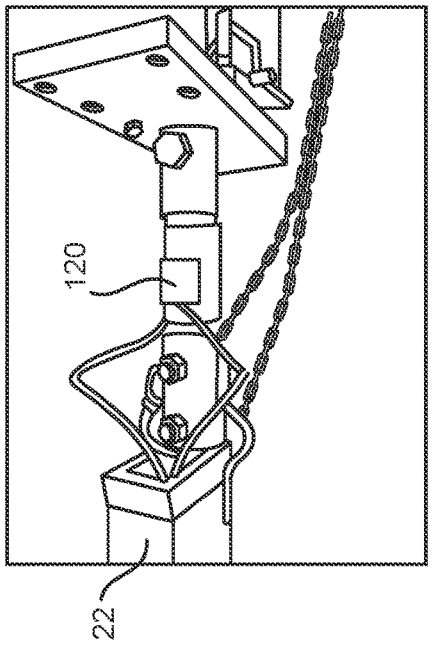
FIG. 18 is a top plan view showing a weight sensor of a weight measurement system coupled to the tongue of the trailer.
Figure 20:
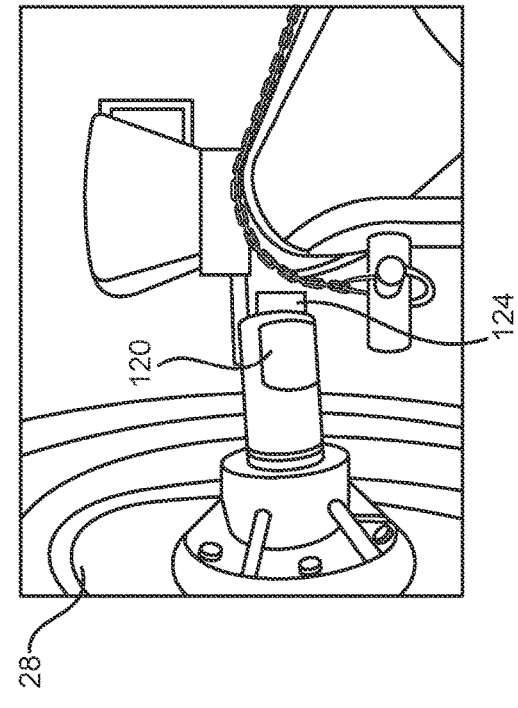
FIG. 20 is a top plan view showing a weight sensor of the weight measurement system coupled to an axle of the left wheel.
Figure 19:
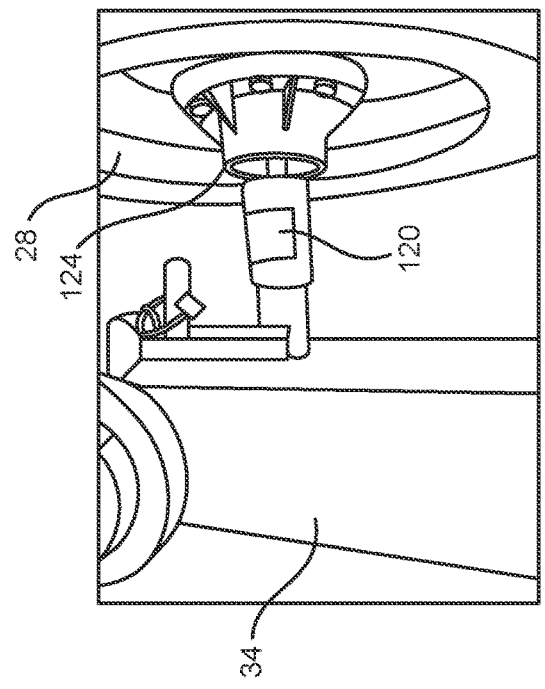
FIG. 19 is a top plan view showing a weight sensor of the weight measurement system coupled to an axle of the right wheel.

As briefly explained above, the lift cylinder 56 and the arm cylinders 90 may be powered by the same hydraulic system. Referring to FIG. 17, in the illustrated embodiment, the hydraulic system includes a source of hydraulic fluid 100, a series of fluid lines 102 fluidly connected to the source of hydraulic fluid and the lift and arm cylinders 56, 90, a fluid mover 104 (e.g., a pump) fluidly connected to the series of lines for driving fluid into the respective lift and arm cylinders, and valves 106 (e.g., valve manifold) for controlling the direction of flow of fluid into the respective lift and arm cylinders. In the illustrated embodiment, the hydraulic system includes three valves 106: a first valve for controlling upward and downward movement of the lift cylinder 56, a second valve for controlling lateral telescoping movement of the left lift arm 52, and a third valve for controlling lateral telescoping movement of the right lift arm 52. Manual actuators 110 control operation of the valves 106, although in other embodiments the valves may be controlled electronically and even remotely, such as within the cabin of the vehicle V.

Figure 22:
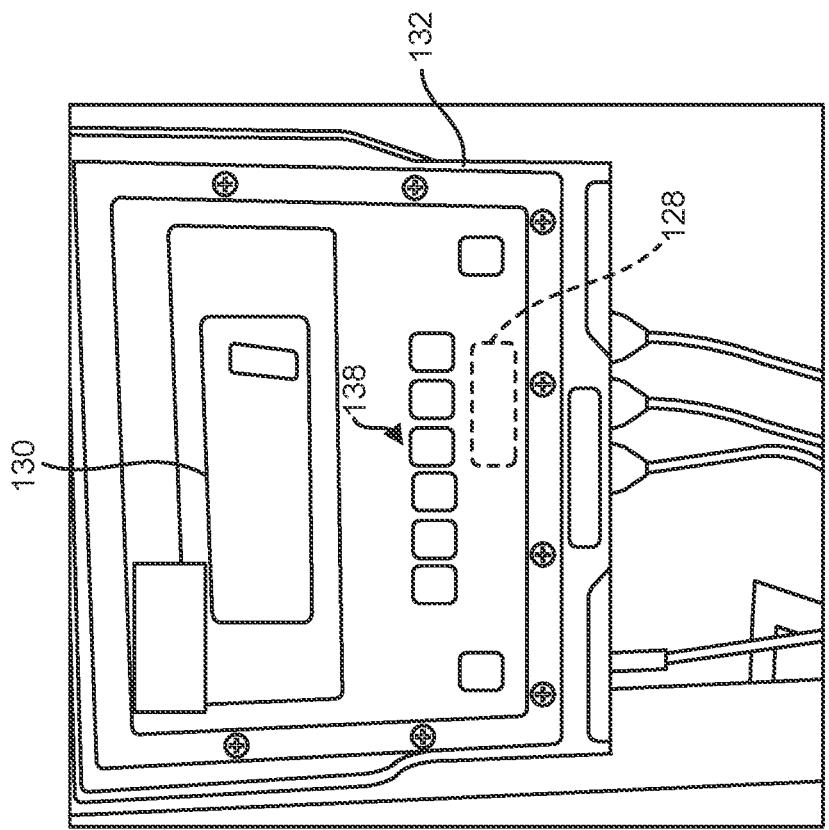
FIG. 22 is an enlarged front elevational view of the display of the weight measurement system.
Figure 21:
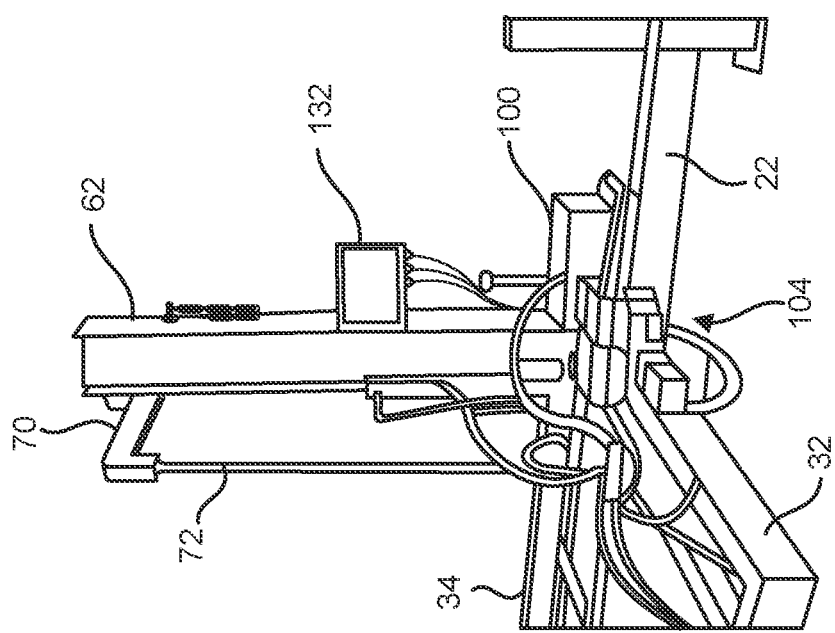
FIG. 21 is a view showing a display of the weight measurement system.

Referring to FIGS. 4 and 18-20, the illustrated weight measurement system 16 includes a plurality of sensors 120 (e.g., three sensors) operatively coupled to the trailer 20 and configured to sense the weight of the bale of crop B when it is lifted by the lift arms 52. The illustrated sensors 120 are coupled to the tongue 22 (or coupler 24) and each wheel axle 124 of the trailer 12. It is understood that the sensors may be coupled to the trailer 12 at other locations. The sensors 120 may be load cell sensors which transmit a signal to a controller 128 (FIG. 22) of the weight measurement system 16 based on the sensed weight of the bale of crop B. The controller 128 receives the signals, computes weight of the bale B based on the received signals, and further provides a digital readout to the user on a display 130. In the illustrated embodiment, the controller 128 is housed within an enclosure 132 secured to the trailer, such as on the mast 62 adjacent the valves 106. The enclosure 132 also includes the display 130 to provide the digital readout of the weight and a user interface 138 for operating the weight measurement system 16. In other embodiments, the user interface 138 and the display 130 (and optionally the controller 128) may be located in the cabin of the vehicle V, for example, or some other location remote from the trailer 12. These components may be wireless. The weight measurement system 16 may also include a wireless transmitter for sending weight data to a remote location, such as a remote server, for collection.

An example of a method of weighing a bale of crop B using the portable weighing scale 10 will now be described. The portable weighing scale 10 may be delivered to a field of crop (such as an experimental field) by towing the weighing scale on roadways, including highways. During transportation to the desired field, the wheels 28 of the trailer 12 may be positioned in the road position, as shown in FIGS. 1 and 3, for example. At the field, the wheels 28 of the trailer 12 may be rotated about the vertical axes to the weighing position, as shown in FIGS. 2 and 4, for example, to enable weighing of bales of crop B in the field. As an example, as shown in FIGS. 8-10, the each wheel 28 may be moved to the weighing position by lifting the wheel 28 off the ground, such as by angling the telescoping lift arms 52 downward and extending the arm to contact the ground and lift the frame (FIG. 8). After lifting the wheel 28 off the ground, the wheel is unlocked, such as by removing the locking pin 46 (FIG. 9), and then the wheel is rotated about the vertical axis V1 to the weighing position (FIG. 10). The locking pin 46 may then be reinserted to lock the wheel 28 in the weighing position.

Figure 12:
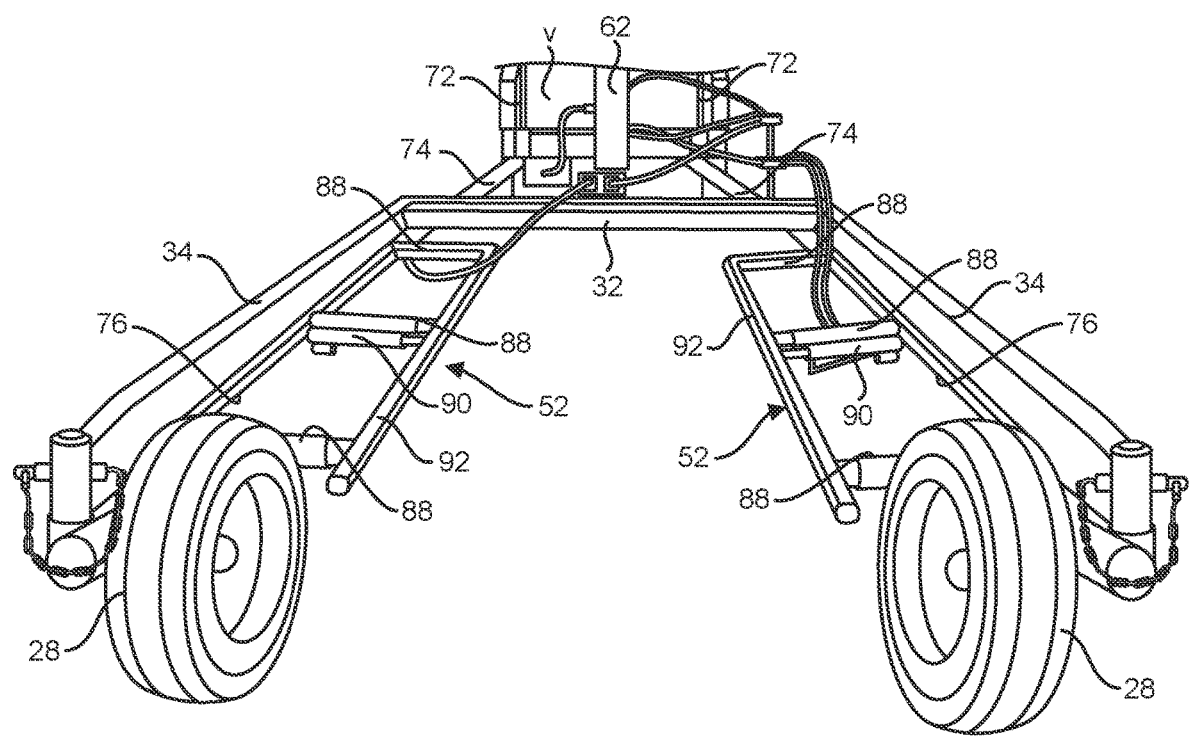
FIG. 12 is a rear perspective of the weighing scale, with the wheels in the road position and the lift arms in the upward lifting position and the retracted position.

The weighing scale 10 is towed about the field to weigh one or more bales of crop at the locations where the bales where formed. The lift arms 52 may be positioned in the lifting position, such as shown in FIG. 12, when towing in the field to avoid dragging the lift arms on the ground or hitting debris. At each bale B, the operator of the vehicle V towing the weighing scale 10 backs the weighing scale toward the bale B so that the bale is positioned within the open interior space 38 of the trailer 12. Before backing up the weighing scale 10, the lift arms 52 are positioned in a lower loading position, such as about a 10 degree to about a 30 degree angle relative to the respective left and right beams 34. The lift arms 52 may also be positioned in the retracted position. With the bale B in the open interior space 38 of the trailer 12, the operator positions the lift arms 52 under the bale by actuating the valves 106. The lift arms 52 are independently extendable and retractable, so that the user can position the bale B to be generally equally between the lift arms. With the lift arms 52 suitably positioned under the bale B, the operator lifts the bale B by actuating the valve 106 controlling the jack 50. The bale B is lifted off the ground to a suitable height so that the weight of the bale can be measured using the weight measurement system 16. After measuring and recording the weight, the bale of crop B is lowered back to the ground, and the operator can drive forward, leaving the bale in the same location where it was formed.

It is envisioned that in one or more embodiments, the operator may weigh bales of crop without leaving the vehicle. In such an embodiment, the weighing scale may be operated within the vehicle (e.g., within the cabin of the vehicle). For example, controls for the hydraulic valves, the fluid mover, and the weight measurement system may be located in the vehicle. A display for the weight readout may also be located in the vehicle. In addition, one or more cameras can be coupled to the trailer and a display for the camera(s) can be provided in the vehicle to allow the operator to view the trailer and bale when backing up to the bale and also view the lift arms when positioning the lift arms under the bale and lifting the bale. Other designs to allow the operator to weight bales of crop without leaving the vehicle are possible.

Having described embodiments of the invention in detail, it will be apparent that modifications and variations are possible without departing from the scope of the invention defined in the appended claims.

When introducing elements of the present invention or embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A portable weighing scale for weighing a bale of crop, the portable weighing scale comprising:
    a support frame configured to be transported on ground, the support frame including a front beam and left and right side beams extending away from the front beam to define an open interior space between the left and right side beams, wherein the open interior space is sized and shaped to receive the bale of crop therein;
    a powered lift operatively coupled to the support frame, the powered lift including at least one lift arm disposed in the open interior space and configured to move relative to the frame to lift the bale of crop received in the open interior space off the ground; and
    a weight measurement system operatively coupled to the support frame and configured to measure the weight or mass of the bale of crop when the bale of crop is lifted off the ground by the power lift.

2. The portable weighing scale set forth in claim 1, further comprising at least one wheel operatively coupled to the support frame to allow for ground transportation of the support frame.

3. The portable weighing scale set forth in claim 1, wherein the powered lift is hydraulically powered to impart lifting of the at least one lift arm.

4. The portable weighing scale set forth in claim 1, wherein the at least one lift arm comprises a left lift arm operatively connected to the left side beam, and a right lift arm operatively connected to the right side beam.

5. The portable weighing scale set forth in claim 4, wherein the left and right lift arms are selectively rotatable about a generally horizontal axis to lift the bale of crop receiving in the open interior space.

6. The portable weighing scale set forth in claim 5, wherein the left and right lift arms are selectively extendable toward a center of the open interior space to increase respective widths of the left and right lift arms.

7. The portable weighing scale set forth in claim 5, wherein the powered lift includes a jack and mechanical linkage operatively connecting the jack to the left and right lift arms to selectively impart rotation to the left and right lift arms about the generally horizontal axis.

8. The portable weighing scale set forth in claim 7, wherein the jack includes a hydraulic cylinder.

9. The portable weighing scale set forth in claim 7, wherein the mechanical linkage includes left and right rotational driving links operatively connected to the respective left and right lift arms and defining the respective horizontal axes about which the left and right lifts arms are rotatable, wherein vertical movement of the jack imparts rotation of the left and right rotational driving links about their respective longitudinal axes.

10. The portable weighing scale set forth in claim 9, wherein the mechanical linkage further includes left and right rocker links operatively connecting the left and right rotational driving links to the jack.

11. The portable weighing scale set forth in claim 1, wherein the at least one lift arm is selectively extendable toward a center of the open interior space to increase a width of the at least one lift arm.

12. The portable weighing scale set forth in claim 11, further comprising a powered cylinder configured to selectively extend the at least one lift arm toward the center of the open interior space.

13. The portable weighing scale set forth in claim 12, wherein the at least one lift arm includes telescoping cross bars configured to telescopically extend by movement of the powered cylinder.

14. The portable weighing scale set forth in claim 1, further comprising a left wheel operatively coupled to the left side beam, and a right wheel operatively coupled to the right side beam, wherein the left and right wheels are selectively movable relative to the support frame from a road position, in which the wheels are positioned laterally inward of the respective side beams generally within the open interior space, and a weighing position, in which the wheels are positioned laterally outward of the respective side beams generally outside the open interior space.

15. The portable weighing scale set forth in claim 14, wherein the left and right wheels are selectively rotatable relative to the support frame about a vertical axis to move the wheels between the road position and the weighing position.

16. The portable weighing scale set forth in claim 1, wherein the weight measurement system includes at least one weight sensor operatively coupled to the support frame.

17. The portable weighing scale set forth in claim 16, wherein the weight measurement system further includes a controller configured to receive a signal from the at least one weight sensor to compute a weight or mass of the bale of crop when the bale of crop is lifted off the ground by the power lift.

18. A method of weighing a bale of crop in field, the method comprising:
    towing a portable weighing scale to the bale of crop in the field;
    positioning the bale of crop within an open interior space defined between left and right side beams of the portable weighing scale;
    engaging the bale of crop with at least one lift arm disposed in the open interior space;
    lifting the bale of crop off the ground in the field by moving the at least one lift arm relative to the left and right side beams; and
    measuring the weight or mass of the lifted bale of crop using a weight measurement system of the portable weighing scale.

19. A portable weighing scale for weighing a bale of crop, the portable weighing scale comprising:
    a support frame configured to be transported on ground, the support frame including a first beam and left and right side beams extending away from the first beam to define an open interior space between the left and right side beams, wherein the open interior space is sized and shaped to receive the bale of crop therein;
    a left wheel operatively coupled to the left side beam and a right wheel operatively coupled to the right side beam, the left and right wheels selectively movable relative to the support frame between a road position, in which the wheels are positioned laterally inward of the respective left and right side beams generally within the open interior space, and a weighing position, in which the wheels are positioned laterally outward of the respective left and right side beams generally outside the open interior space;

a powered lift operatively coupled to the support frame and configured to lift the bale of crop off the ground;

a weight measurement system operatively coupled to the support frame and configured to measure the weight or mass of the bale of crop when the bale of crop is lifted off the ground by the power lift.

20. The portable weighing scale set forth in claim 19, wherein the left and right wheels are selectively rotatable relative to the support frame about a vertical axis to move the wheels between the road position and the weighing position.

* * * * *